US00RE48078E

(19) United States
(12) Reissued Patent
Carroll

(10) Patent Number: US RE48,078 E
(45) Date of Reissued Patent: Jul. 7, 2020

(54) METHOD AND APPARATUS FOR EVAPORATING WASTE FLUIDS

(71) Applicant: John W. Carroll, San Juan, TX (US)

(72) Inventor: John W. Carroll, San Juan, TX (US)

(21) Appl. No.: 16/154,146

(22) Filed: Oct. 8, 2018

Related U.S. Patent Documents

Reissue of:
(64) Patent No.: 9,975,059
Issued: May 22, 2018
Appl. No.: 14/790,177
Filed: Jul. 2, 2015

(51) Int. Cl.

| | |
|---|---|
| ***B01D 1/16*** | (2006.01) |
| ***B01D 24/10*** | (2006.01) |
| ***B01D 24/46*** | (2006.01) |
| ***B01D 1/20*** | (2006.01) |
| ***B01D 35/12*** | (2006.01) |
| ***C02F 1/04*** | (2006.01) |
| *C02F 103/10* | (2006.01) |

(52) U.S. Cl.
CPC ..... *B01D 1/16* (2013.01); *B01D 1/20* (2013.01); *B01D 24/105* (2013.01); *B01D 24/4631* (2013.01); *B01D 35/12* (2013.01); *C02F 1/048* (2013.01); *B01D 2201/586* (2013.01); *C02F 2103/10* (2013.01); *C02F 2201/009* (2013.01); *C02F 2209/03* (2013.01); *Y02A 20/212* (2018.01); *Y02W 10/37* (2015.05)

(58) Field of Classification Search
CPC ..... B01D 1/16; B01D 35/12; B01D 24/105; B01D 24/4631; B01D 1/20; B01D 2201/586; C02F 1/048; C02F 2103/10; C02F 2209/03; C02F 2201/009; Y02W 10/37; Y02A 20/212
See application file for complete search history.

(56) References Cited

U.S. PATENT DOCUMENTS

| | | | | |
|---|---|---|---|---|
| 3,907,686 | A * | 9/1975 | Fletcher | B01D 29/66 201/234 |
| 4,449,849 | A * | 5/1984 | Horn | C02F 1/048 405/52 |
| 8,256,748 | B1 * | 9/2012 | Boulter | C02F 1/048 159/4.4 |
| 8,926,792 | B1 * | 1/2015 | Houston | C02F 1/00 159/4.01 |
| 2012/0260417 | A1 * | 10/2012 | LeBlanc | A47K 3/288 4/612 |
| 2014/0021137 | A1 * | 1/2014 | Smiddy | C02F 9/005 210/663 |
| 2014/0102645 | A1 * | 4/2014 | Abahusayn | B01D 1/20 159/3 |
| 2016/0325202 | A1 * | 11/2016 | Phillips | B01D 1/20 |

* cited by examiner

*Primary Examiner* — Norca L. Torres Velazquez
(74) *Attorney, Agent, or Firm* — Gunn, Lee & Cave, PC

(57) ABSTRACT

A self-contained [portable] waste water evaporating apparatus is shown. A solar-operated submersible pump pumps waste water from just under the surface of a waste water pit, through a pair of automatic backflushing filters and out misters located around the bank of the waste water pit. At a predetermined pressure across the automatic backflushing filters, the automatic backflushing filters are reverse cycled, one at a time, to backflushing particles back into the waste water pit. Periodically, the misters are purged and/or cleaned to remove particles therefrom. In response to sunlight, solar panels provide DC voltage directly to the submersible pump. If pressure from the submersible pump gets excessive, a pressure relief valve removes the excess pressure.

4 Claims, 8 Drawing Sheets

METHOD AND APPARATUS FOR EVAPORATING WASTE FLUIDS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention relates to evaporation of waste fluids and, more particularly, to the evaporation of waste fluids at remote locations involving fracing of oil and/or gas wells.

2. Description of the Prior Art

Throughout the United States, the most common way of getting rid of liquid waste is to inject the liquid waste into a disposal well. Waste water disposal wells are becoming quite common, especially in regions where there is drilling for oil and gas. If hydraulic fracing is used, millions of gallons of water or other fluids will be used in the fracing process to break up the rock and retrieve the oil and gas. The fluid used in the fracing process will come back up along with additional ground water.

Most of this waste water is trucked to disposal wells and injected thousands of feet underground for permanent storage. The hauling of the waste water to disposal wells is expensive. Also, the waste water being injected underground has a tendency to leak.

In the State of Texas alone, the amount of waste water due to fracing that is being disposed of in disposal wells increased from 46 million barrels in 2005 to 3.5 billion barrels in 2011. On average, companies in Texas dispose of 290 million barrels of waste water each month. In the State of Texas alone, there are more than 8,000 active disposal wells, about 850 of which are large commercial operations.

One of the alternatives to disposing waste fluids in a disposal well is to evaporate the fluids to the extent possible so that less fluids will have to be put in a waste disposal well. At many drilling sites, surface collection ponds, or lined pits, may be used to collect the waste water. Some of the surface collection ponds use an evaporation process to reduce the amount of water in the waste water fluid. Systems that spray water into the atmosphere have been used in the past, but are generally very inefficient. Water cannons have been used to spray water into the atmosphere over waste water ponds or containment areas.

SUMMARY OF THE INVENTION

It is an object of the present invention to provide a method and apparatus for evaporation of waste fluids.

It is another object of the present invention to provide a self-contained apparatus to evaporate waste fluids generated in the fracing of oil and gas wells.

It is yet another object of the present invention to provide a self-contained system that may be moved from one location to another and quickly set into operation to evaporate waste water.

It is still another object of the present invention to provide a portable system to evaporate waste water wherever the waste water is collected.

Solar panels provide power to a pump controller to operate a submersible pump contained in a waste water pit. The submersible pump pumps the waste water through automatic backflushing filters to remove the particles therefrom. After the removal of the removal of the particles, the pressurized waste water flows through a plurality of misters to evaporate the waste water into the atmosphere.

A filter controller is operated by a pressure gauge across the automatic backflush fibers. When a predetermined pressure is reached, the pressure triggers the filter controller. The filter controller, which receives its power from any suitable source including solar panels or batteries, will operate the valves on the inlet side of the automatic backflush filters. By operating the valves in a certain order, backflushing can be obtained in each of the automatic backflush filters.

In case the pressure from the submersible pump gets too great, a pressure relief valve is included which discharges any fluid back into a waste water pit. Also, if the evaporator unit cannot handle all of the flow, any excess waste water is dumped back into the waste water pit.

DESCRIPTION OF THE PREFERRED EMBODIMENT

Figure 6:
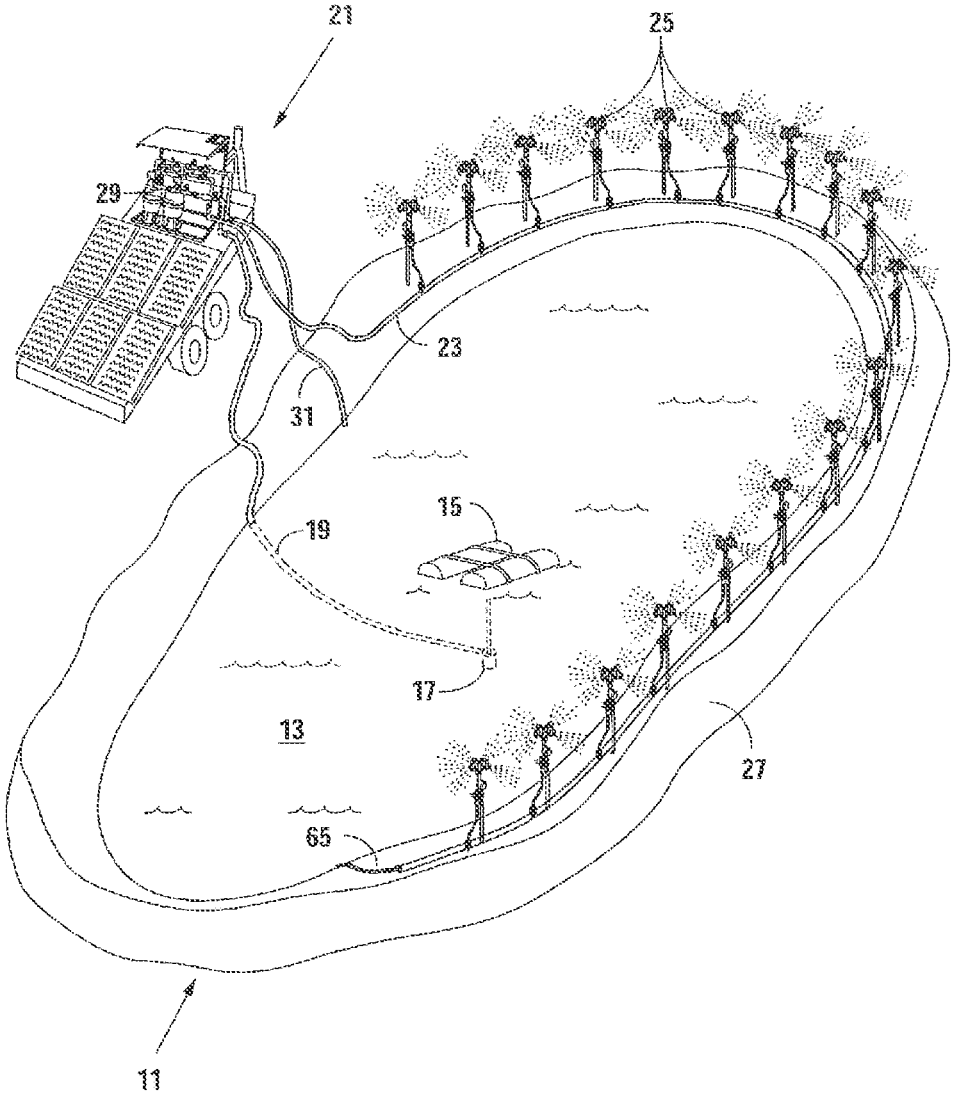
FIG. 6 is a pictorial view of the present invention being used to evaporate waste water from a waste water pit.

Referring, first to FIG. 6 of the drawings, a waste water pit 11 is shown filled with waste water 13. Floating on the waste water 13 is a floatation device 15 that has suspended there below a submersible pump 17. The submersible pump 17 pumps the waste water 13 through pump line 19 to the [portable] waste water evaporating apparatus 21. From the [portable] waste water evaporating apparatus 21, after filtration the waste water 13 is pumped through evaporation line 23 to the misters 25 located on the bank 27 of the waste water pit 11. If the pressure inside of automatic backflushing filters 29 exceeds a predetermined amount, the automatic backflushing filters 29 will be backflushed through filter backflush line 31 into waste water pit 11.

Figure 1:
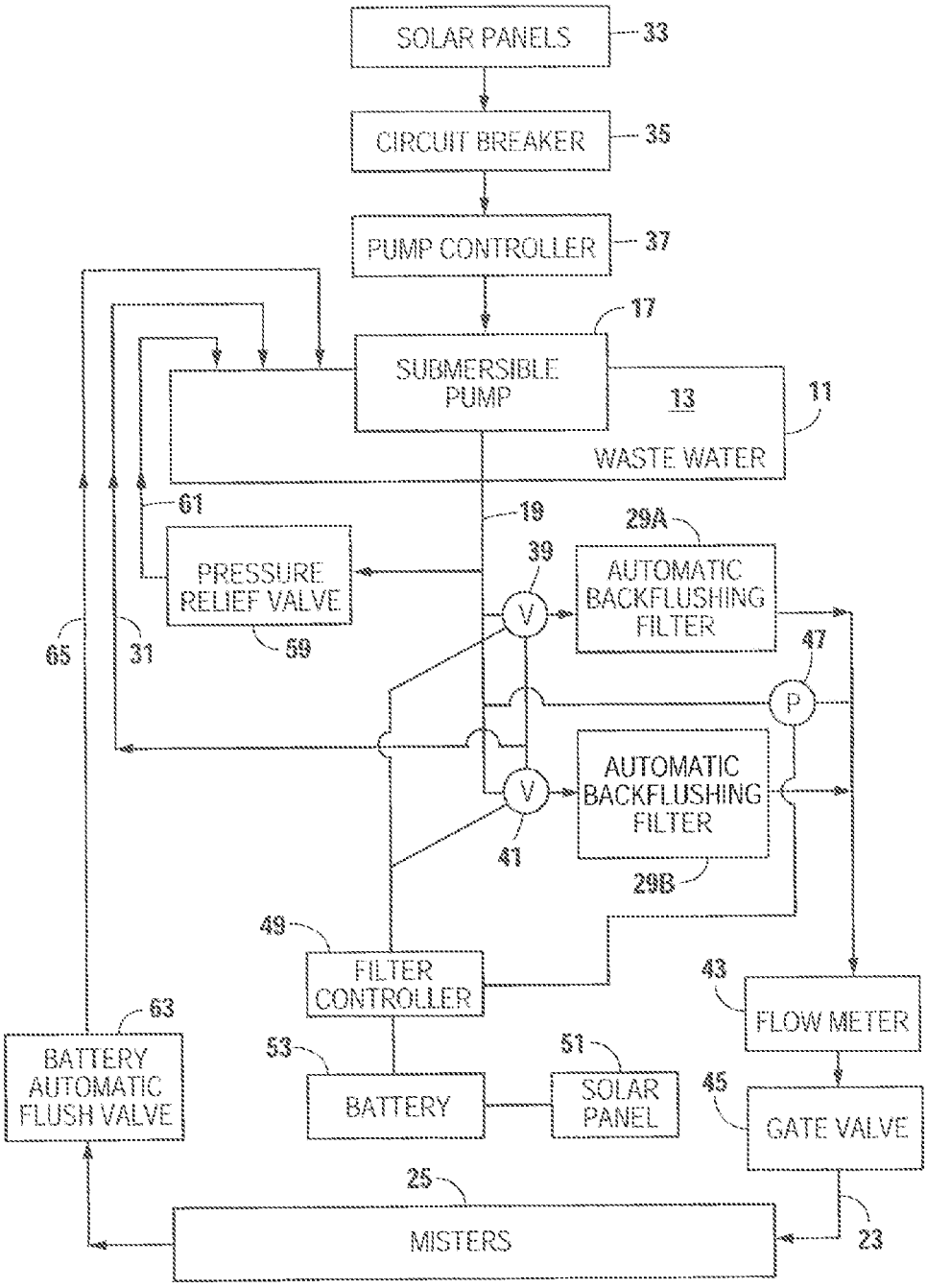
FIG. 1 is a schematic flow diagram of the present invention.
Figure 2:
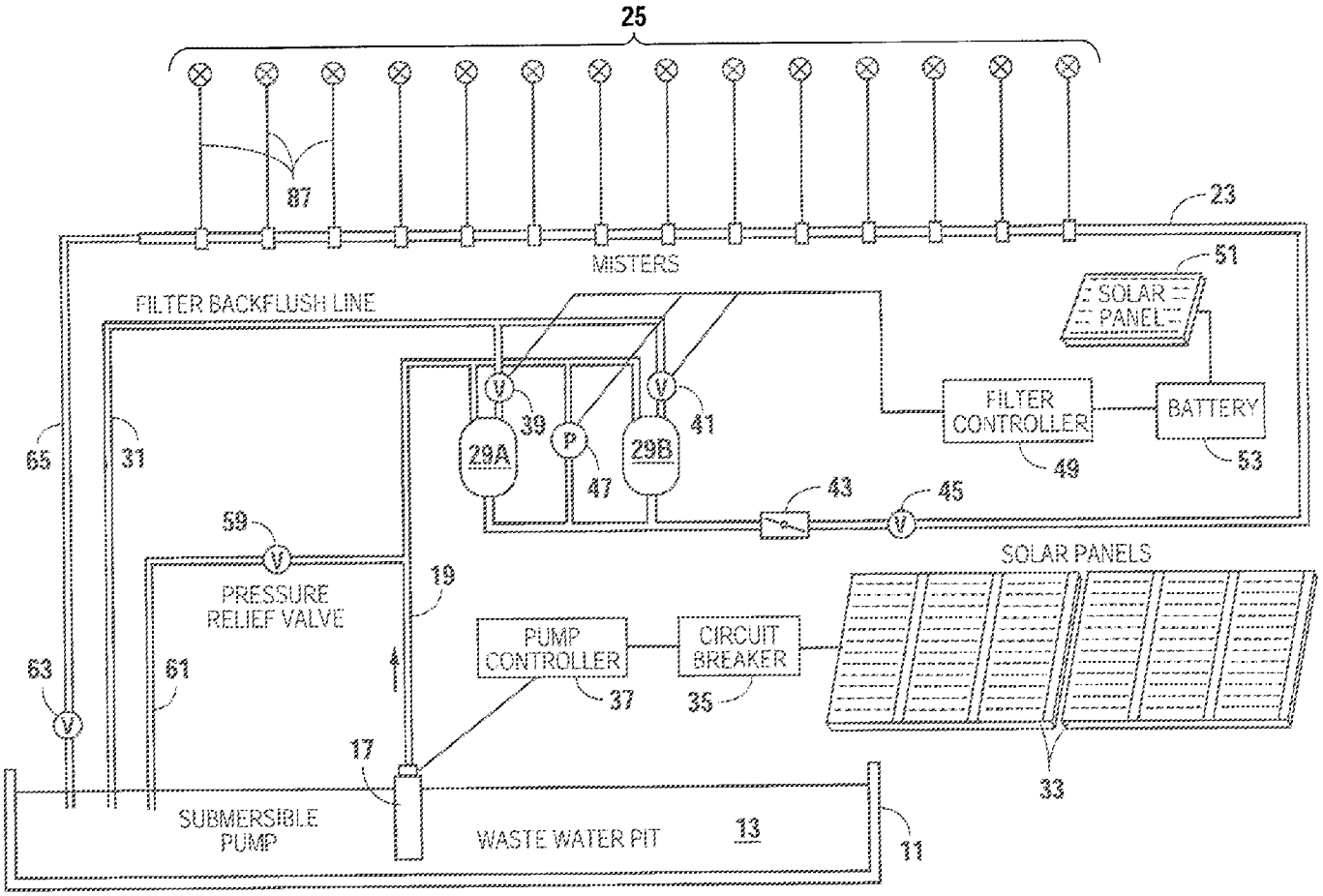
FIG. 2 is a pictorial flow diagram of the present invention.

Referring now to FIGS. 1 and 2 in combination, operation of the [portable] waste water evaporating apparatus 21 will be explained in more detail. The submersible pump 17 in the preferred embodiment is designed to flow approximately 15 gallons per minute (gpm) at approximately 65 pounds per square inch (psi). Solar panels 33 produce an output voltage of between 30 and 300 volts, depending upon the amount of sunlight that is available. Power from the solar panels 33 goes through a circuit breaker 35 to a pump controller 37. From the pump controller 37, the power generated by the solar panels 33 feeds directly to the submersible pump 17, which is a DC pump. The circuit breaker 35 ensures that the voltage generated by solar panels 33 does not exceed the maximum voltage level of the submersible pump 17. This is important on a really hot day with a lot of sunshine. As the sunlight decreases, the amount of voltage generated by the solar panel 33 decreases and, hence, the speed of the submersible pump 17 decreases.

When power is being provided by the solar panels 33 via circuit breaker 35 and pump controller 37 to the submersible pump 17, waste water 13 is pumped from the waste water pit 11 through pump line 19 and valves 39 and 41 to automatic backflushing filters 29A and 29B. After filtration in the automatic backflushing filters 29A and 29B, the waste water flows through flow meter 43 that records the amount of flow. Gate valve 45 prevents backflow from the evaporation line 23 and the misters 25. While the flow meter 43 will record the flow of the waste water 13, gate valve 45 will prevent back-flow of the waste water 13.

The submersible pump 17 as located in the waste water pit 11 has the inlet side of the pump slightly lower than the outlet side of the pump. This ensures waste water 13 flows across the submersible pump 17 in the proper manner to help keep the submersible pump 17 cool. The location of the submersible pump 17 is just below the surface of the waste water 13 contained in the waste water pit 11 because there are less contaminates towards the surface than there will be towards the bottom of the waste water pit 11.

Monitoring the pressure across the automatic backflushing filters 29A and 29B is a pressure gauge 47. The pressure as measured across automatic backflushing filters 29A and 29B by the pressure gauge 47 is automatically fed to filter controller 49. Because the filter controller 49 requires much less power than the submersible pump 17, a separate solar panel 51 and battery 53 is used to operate the filter controller 49. In this manner, the solar panel 51, battery 53 and the filter controller 49 can be a separate stand-alone unit which is simpler and easier to operate.

When the pressure measured by pressure gauge 47, which measurement is being taken across automatic backflush filters 29A and 29B, exceeds a predetermined amount the filter controller 49 will operate valves 39 and 41 in such a manner to backflush one at a time the automatic backflushing filters 29A and 29B. The waste water 13 from the backflushing of automatic backflushing filters 29A and 29B is fed through filter backflush line 31 into waste water pit 11.

Figure 3A:
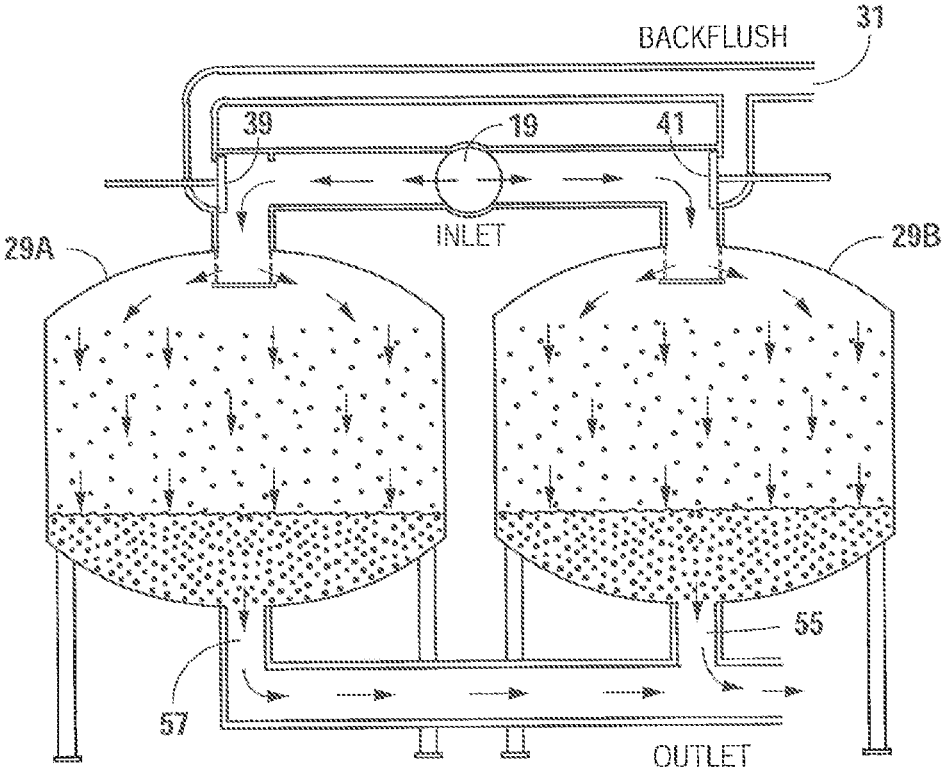
FIG. 3A shows the normal operation of a pair of automatic backflushing filters.
Figure 3B:
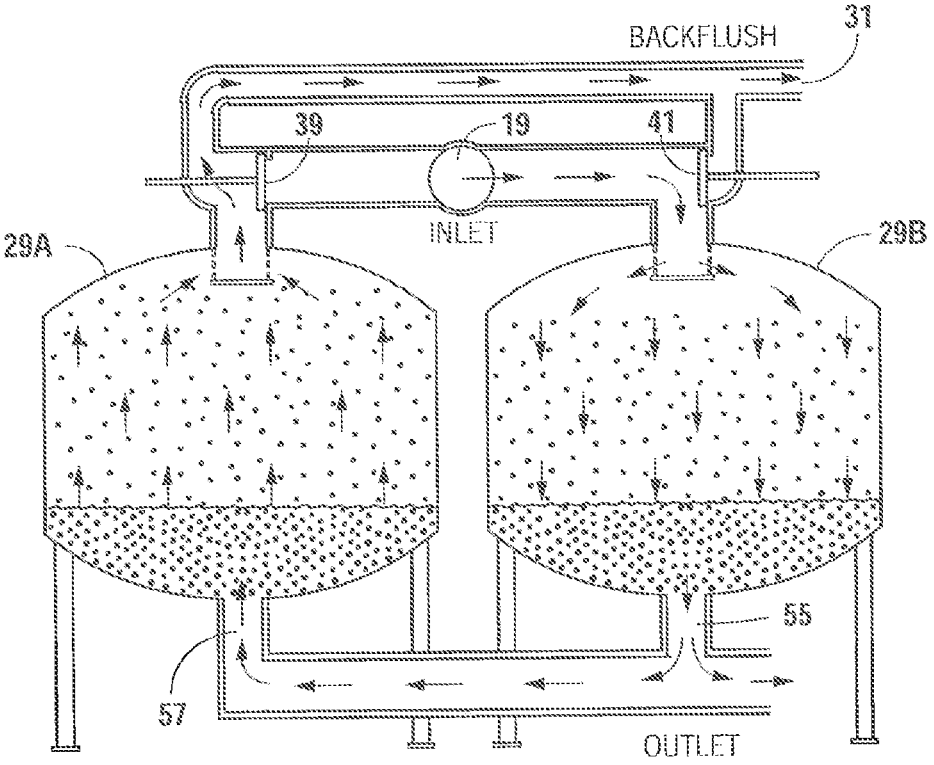
FIG. 3B is the same as FIG. 3A, except one of the filters is being backflushed.
Figure 3C:
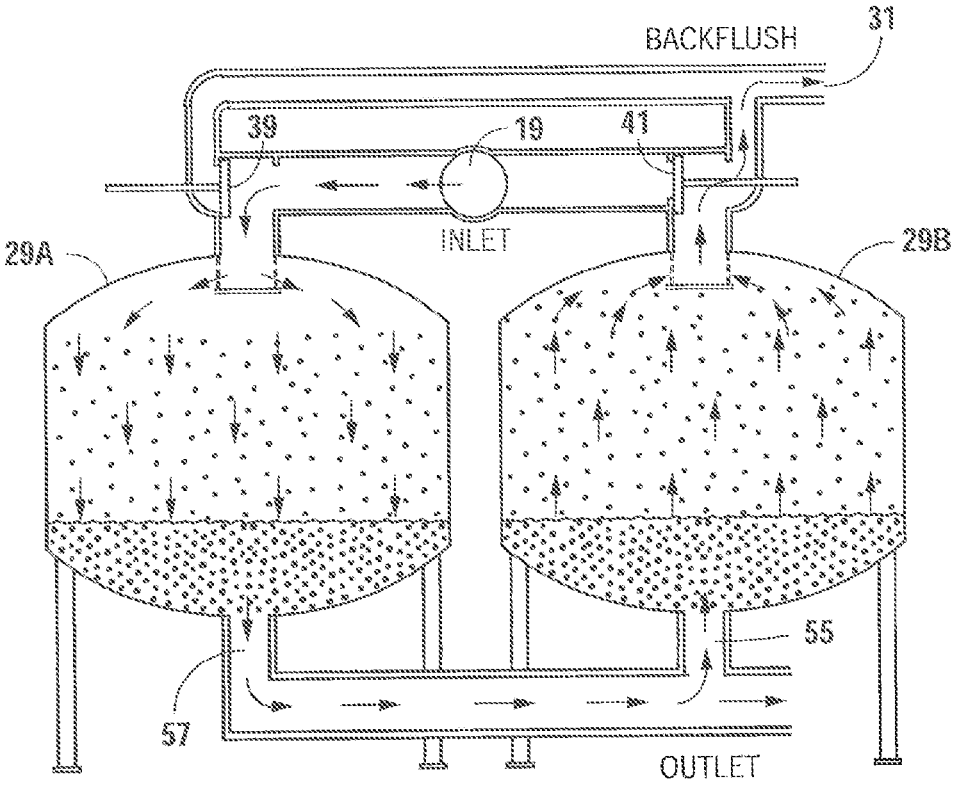
FIG. 3C is the same as FIG. 3B, except the other filter is being backflushed.

Referring now to FIGS. 3A through 3C, the backflushing of automatic backflushing filters 29A and 29B will be explained in more detail. Normal operation of the automatic backflushing filters 29A and 29B is shown in FIG. 3A with the waste water 13 coming in through pump line 19 into both automatic backflushing filters 29. After filtration, the waste water 13 flows out through outlet 55.

If the pressure gauge 47 exceeds a predetermined amount, the filter controller 49 will switch valve 39 from the position shown in FIG. 3A to the position as shown in FIG. 3B.

Referring now to FIG. 3B, as the waste water flows in through pump line 19 is filtered and out filter outlet 55, the waste water 13 may either flow left or right. To the right, a back pressure is built up in the evaporator line 23 by the misters 25 (see FIG. 6). To the left of filter outlet 55, the back pressure is less. Therefore, the waste water will flow up through automatic backflushing filter 29A, past valve 39, and out filter backflush line 31 to the waste water pit 11.

After a predetermined amount of time, valves 39 and 41 switch to the positions as shown in FIG. 3C. In FIG. 3C, waste water comes in through pump line 19 and flows through automatic backflushing filter 29A and out filter outlet 57. However, when the waste water reaches filter outlet 55 of automatic backflushing filter 29B, the pressure in filter outlet 55 is less than the pressure in the evaporator line 23 that connects to the misters 25. Therefore, the waste water from automatic backflushing filter 29A will flow up through automatic backflushing filter 29B through valve 41 and out filter backflush line 31, which is illustrated in FIG. 3C. After a second predetermined amount of time as set by the filter controller 49, valves 39 and 41 will be switched back to the positions as illustrated in FIG. 3A, backflushing terminated and normal filtration again being provided by the automatic backflushing filters 29A and 29B prior to flowing the waste water 13 out through evaporator line 23 to misters 25. During the backflushing operation, the location of the filter backflush line 31 inside of waste water pit 11 should be some distance away from the submersible pump 17 as contained in the waste water pit 11 (see FIG. 6).

While the system is designed to operate at a maximum of 65 psi at 15 gpm, something could happen to restrict the flow. If that occurs, pressure could built up that would exceed 65 psi. As a safety feature, a pressure release valve 59 is provided on the pump line 19 and that connects through a pressure release line 61 back into the waste water pit 11 (see FIGS. 1 and 2). While the pressure release valve 59 and the pressure relief line 61 are optional, they are a safety feature that should be included. By appropriate check valves, the pressure release valve 59 could be connected to the filter backflush line 31 for discharge back into the waste water pit 11.

Over time, contaminants have a tendency to build up in the misters 25. A battery-operated automatic flush valve 63 may be opened so that waste water 13 flows through evaporator line 23 past misters 25 and out flush line 65 back into waste water pit 11 (see FIGS. 1 and 2). This allows the contaminants to be flushed out of the evaporator line 23 and hopefully out of the misters 25.

Figure 4:
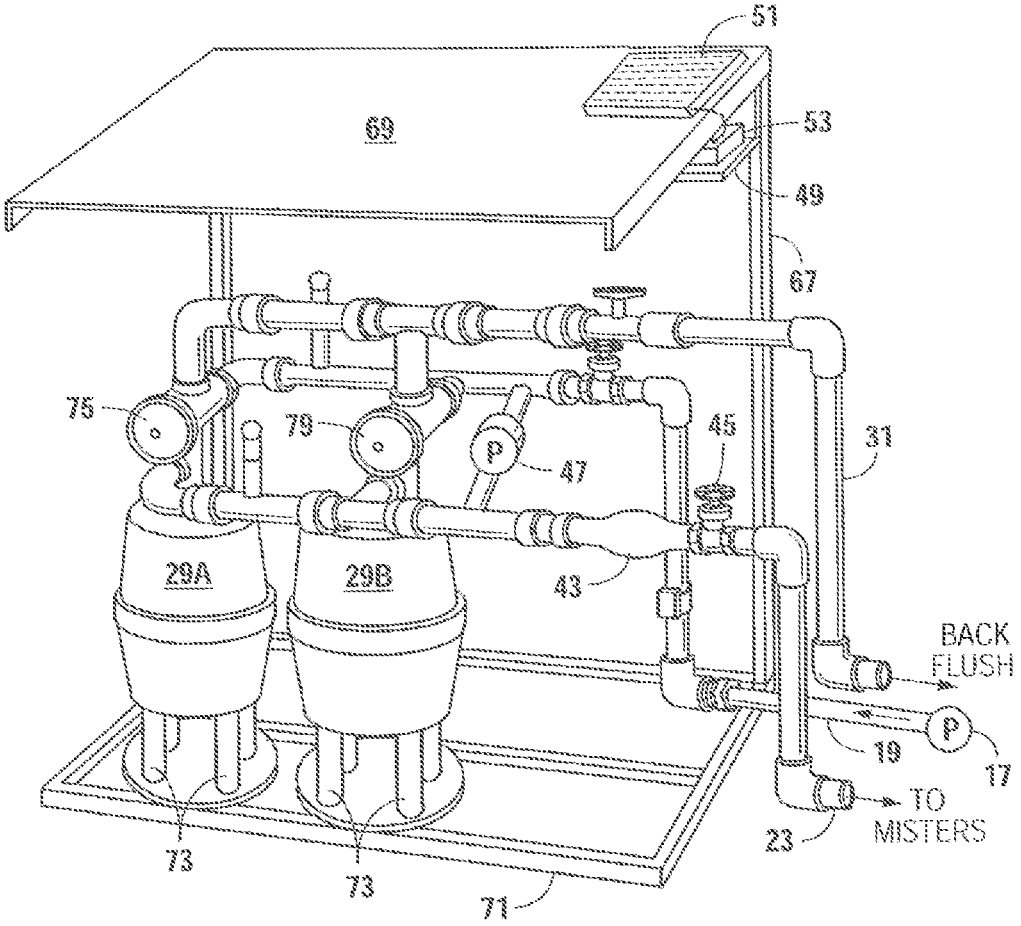
FIG. 4 is a pictorial view of the connections to the automatic backflushing filters.

Referring now to FIG. 4, a portion of the [portable] waste water evaporating apparatus 21 is shown. The automatic backflushing filters 29A and 29B are located on a frame 67 that has a top 69 and a base 71. The automatic backflushing filters 29A and 29B are located on legs 73, extending down to the base 71. Mounted on the top 69 is a solar panel 51. Immediately there below is the battery 53 and filter controller 49. This can be purchased as a single unit.

Above each of the automatic backflushing filters 29A and 29B inside of valve housing 75 and 79 are located valves 39 and 41, respectively. During normal operation, the waste water 13 will flow in from submersible pump 17, through pump line 19, into valves 39 and 41, and to automatic backflush filters 29A and 29B, respectively. During backflushing, the backflush fluid will go out through filter backflush line 31 to the waste water pit 11.

Figure 5:
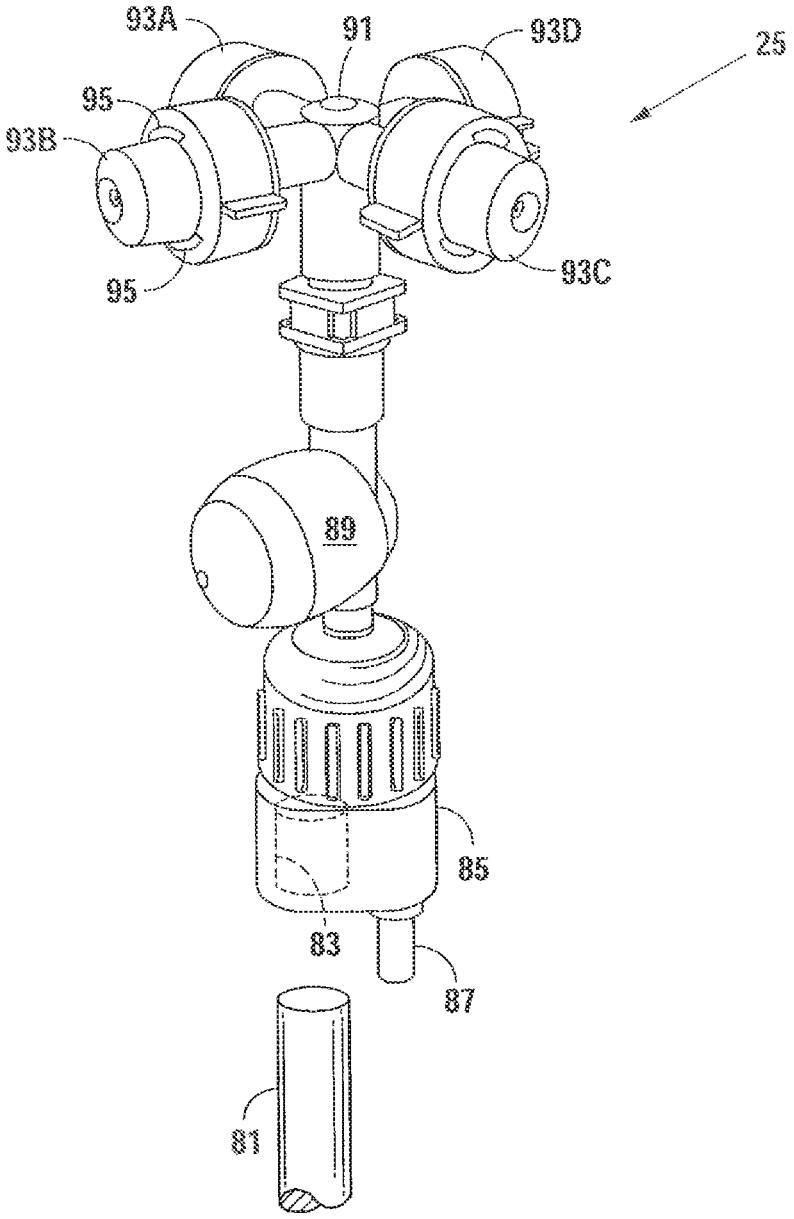
FIG. 5 is a perspective view of one of the misters.

Referring now to FIG. 5, an individual mister 25 is shown. The mister 25 can be mounted on a rod 81 the lower end of which is stuck into the ground on the bank 27 of the waste water pit 11. The top end of the rod 81 extends up into rod receiving cavity 83 of the mister 25. The rod 81 is approximately 5 ft. long so that the mister 25 is a distance above the bank 27. The rod receiving cavity 83 is in a fitting 85 of the mister 25. The fitting 85 has the rod receiving cavity 83 therein and a small line 87 that connects down to the evaporation line 23 (see FIG. 2). Above the fitting 85 is located a check valve 89 so that flow from the small line 87 can only be in one direction, i.e., towards the top. Mounted at the top of mister 25 is a four-way distributor manifold 91 that receives filtered waste water through small line 87. From the four-way distributor manifold 94, pressurized waste water is distributed to each evaporation head 93A, 93B, 93C and 93D.

Each of the misters 25 (including all four evaporator heads 93) has a flow rate of roughly 8 gals./hour. At a flow rate of 15 gpm from the submersible pump 17, that flow rate will support 112 misters 25.

The automatic backflushing filters 29A and 29B filter out particles down to approximately 70μ, which is about as small as the naked eye can see. However, periodically, particles may get stuck in the evaporator heads 93A, 93B, 93C or 93D. On each of the evaporator heads 93A, 93B, 93C and 93D are located tabs 95 that allow the respective evaporator head 93 to be removed and cleaned.

In a typical set up by the present invention, the flow rate would be approximately 15 gpm. Assuming there are twelve hours of operating time, that is 10,800 gallons of waste water that can be evaporated per day, which is approximately 257 barrels. If the cost of hauling and ejection of waste water is $10 per barrel, that's a savings of $2,570 per day.

At the end of the drilling operation, the misters 25 can be removed and an irrigation system connected thereto to revegetate the drilling site.

What I claim is:

1. A self-contained[, portable,] waste water evaporating apparatus for evaporating waste water containing particles therein from a remote waste water pit having banks there around, said apparatus comprising:

a floatation device in said waste water pit;

a submersible pump suspended below said floatation device near a surface of said waste water pit;

a pair of automatic backflushing filters on a cart on said bank, said backflushing filters removing said particles down to approximately 70 microns;

pump line connecting said submersible pump to said pair of said automatic backflushing filters;

a plurality of misters *located* spaced apart in a row on said bank of said waste water pit, said misters *being spaced apart* creating water droplets of less than 70 microns in diameter;

evaporation line connecting filter outlets of said pair of said automatic backflushing filters to said plurality of said misters;

solar panels on said cart for providing electrical power directly to said submersible pump so that during sunlight said submersible pump pumps said waste water from said waste water pit through said pair of said automatic backflushing filters and out said evaporation line to said plurality of misters;

pressure gauge across said pair of said automatic backflushing filters;

filter controller connected to said pressure gauge so that if pressure of said pressure gauge exceeds a predetermined amount said filter controller operates backflushing valves on an inlet side of said pair of said automatic backflushing filters while maintaining flow of said waste water from said submersible pump so that each filter of said pair of said automatic backflushing filters is separately backflushed;

a flush valve connects said evaporation line with said plurality of said misters thereon back to said waste water pit via a mister flush line, said flush valve allowing said plurality of said misters to be periodically [flushed] *backflushed*;

a pressure relief valve connecting a pressure side of said submersible pump through a pressure relief line back to said waste water pit so that if pumping pressure exceeds a predetermined amount, said pressure relief valve will open; and during [said] backflushing said backflushing valves operate so that in sequential order (a) a first of said pair of said automatic backflushing filters is subsequently backflushed out a backflush line into said waste water pit, (b) a second of said pair of said automatic backflushing filters is backflushed out said filter backflush line into said water waste water pit and (c) thereafter, said pair of said automatic backflushing filters are returned to their original positions with flow of said waste water from said pair of said automatic backflushing filters to said plurality of misters being resumed.

2. A self-contained[, portable,] waste water evaporating apparatus for evaporating waste water from a remote waste water pit as recited in claim 1 further includes a flow meter in said evaporation line to measure the amount of said waste water that is evaporated.

3. A self-contained[, portable,] waste water evaporating apparatus for evaporating waste water from a remote waste water pit as recited in claim 2 further includes a controller solar panel and controller battery for providing separate power to said filter controller.

4. A self-contained[, portable,] waste water evaporating apparatus for evaporating waste water from a remote waste water pit as recited in claim 3 further includes a pump controller located between said solar panels and said submersible pump to provide voltage between a predetermined voltage range to operate said submersible pump.

* * * * *